United States Patent
Nozawa et al.

(10) Patent No.: US 12,554,727 B2
(45) Date of Patent: Feb. 17, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventors: Takuma Nozawa, Tokyo (JP); Yuyang Dong, Tokyo (JP); Masafumi Enomoto, Tokyo (JP); Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/685,351

(22) PCT Filed: Sep. 7, 2021

(86) PCT No.: PCT/JP2021/032767
§ 371 (c)(1),
(2) Date: Feb. 21, 2024

(87) PCT Pub. No.: WO2023/037399
PCT Pub. Date: Mar. 16, 2023

(65) Prior Publication Data
US 2024/0394265 A1 Nov. 28, 2024

(51) Int. Cl.
*G06F 16/00* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 2012/0004925 A1* | 1/2012 | Braverman | G06Q 10/00 706/46 |
| 2014/0379388 A1* | 12/2014 | Lundberg | G06F 16/24578 705/310 |
| 2015/0205793 A1* | 7/2015 | James | G06F 16/71 707/741 |

(Continued)

FOREIGN PATENT DOCUMENTS

| | | |
|---|---|---|
| JP | 2014-056573 A | 3/2014 |
| JP | 2016-081213 A | 5/2016 |

(Continued)

OTHER PUBLICATIONS

International Search Report for PCT Application No. PCT/JP2021/032767, mailed on Nov. 30, 2021.

*Primary Examiner* — Hasanul Mobin
(74) *Attorney, Agent, or Firm* — Sughrue Mion, P.L.L.C.

(57) ABSTRACT

To display information providing an insight required by a user, provided is an information processing apparatus (1) including: an obtaining section (11) that obtains an evaluation dataset and context data; a relevance calculation section (12) that calculates a relevance between the context data and a constituent element of the evaluation dataset; an evaluation section (13) that carries out evaluations of a plurality of insight subjects generated with reference to the evaluation dataset and the relevance; and a display section (14) that displays information relevant to the insight subjects.

13 Claims, 16 Drawing Sheets

(56) References Cited

U.S. PATENT DOCUMENTS

| | | | | |
|---|---|---|---|---|
| 2017/0053064 A1* | 2/2017 | Bhavani | .............. | G06F 16/5866 |
| 2017/0132731 A1* | 5/2017 | Morimoto | ............. | G06F 16/951 |
| 2017/0139907 A1* | 5/2017 | Aravamudan | ......... | G06N 20/00 |
| 2019/0228335 A1* | 7/2019 | Suzuki | ................ | G06F 16/3344 |
| 2019/0304575 A1* | 10/2019 | Beltre | ................... | G16H 40/20 |
| 2020/0327120 A1* | 10/2020 | Puzis | .................. | G06F 16/9532 |
| 2022/0207030 A1* | 6/2022 | Chowdhury | ........... | G06N 20/00 |
| 2022/0207087 A1* | 6/2022 | Glass | ................ | G06F 16/24578 |
| 2024/0330993 A1* | 10/2024 | Al-Qurishi | .............. | G06F 40/20 |
| 2024/0394265 A1* | 11/2024 | Nozawa | ............ | G06F 16/24578 |
| 2025/0117666 A1* | 4/2025 | Brenner | ................. | G06N 3/091 |
| 2025/0217373 A1* | 7/2025 | Lee | ................... | G06F 16/24578 |

FOREIGN PATENT DOCUMENTS

| | | |
|---|---|---|
| JP | 2019-128634 A | 8/2019 |
| WO | 2016/027318 A1 | 2/2016 |
| WO | 2018/173251 A1 | 9/2018 |
| WO | 2020/059025 A1 | 3/2020 |

\* cited by examiner

FIG. 5

EXAMPLE OF INPUT DATA

SALES DATA

| DATE | PRODUCT CODE | CUSTOMER CODE | STORE CODE | SALES |
|---|---|---|---|---|
| 2021/4/1 | 001 | 00001 | 01 | 100 |
| 2021/4/1 | 002 | 00002 | 02 | 200 |
| 2021/4/1 | 001 | 00003 | 03 | 100 |
| ... | ... | ... | ... | ... |

STORE DATA

| STORE CODE | STORE NAME | REGION | SIZE |
|---|---|---|---|
| 01 | STORE X | KANTO DIST. | LARGE |
| 02 | STORE Y | KANSAI DIST. | LARGE |
| 03 | STORE Z | KANTO DIST. | MEDIUM |
| ... | ... | ... | ... |

PRODUCT DATA

| PRODUCT CODE | PRODUCT NAME | CATEGORY | UNIT PRICE |
|---|---|---|---|
| 001 | PRODUCT A | SPORTS | 100 |
| 002 | PRODUCT B | OUTDOOR ACTIVITIES | 200 |
| 003 | PRODUCT C | COSMETICS | 300 |
| ... | ... | ... | ... |

CUSTOMER DATA

| CUSTOMER CODE | AGE | GENDER | HOMETOWN | OCCUPATION | INCOME |
|---|---|---|---|---|---|
| 00001 | 30 | MALE | TOKYO | BUSINESSPERSON | JPY 5M |
| 00002 | 20 | FEMALE | OSAKA | STUDENT | JPY 3M |
| 00003 | 25 | FEMALE | KANAGAWA | SELF-EMPLOYED | JPY 4M |
| ... | ... | ... | ... | ... | ... |

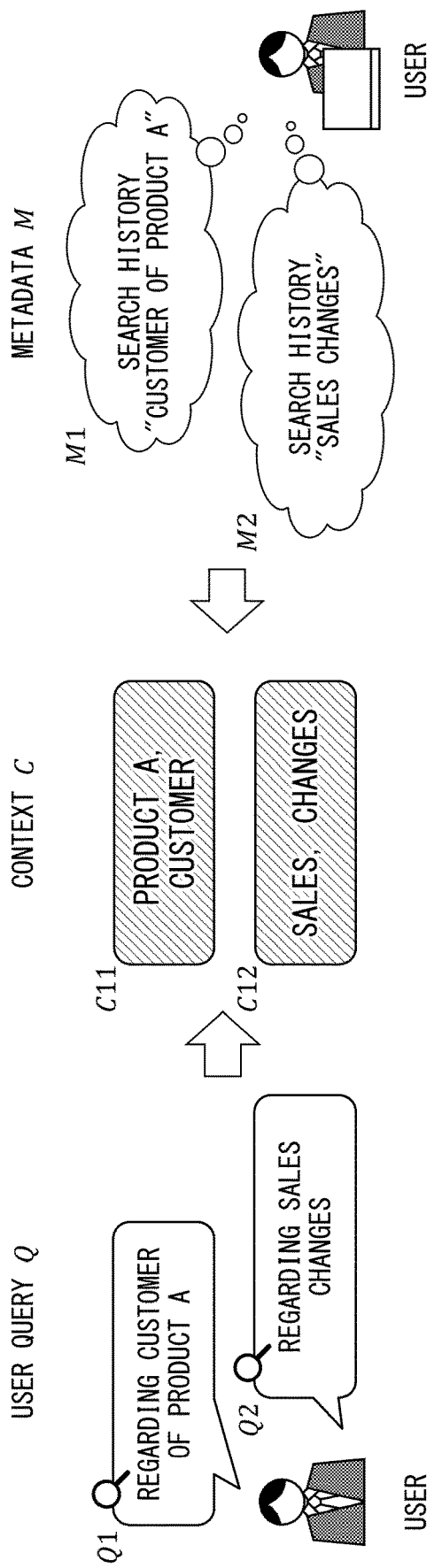

FIG. 8

CONTEXT C12: SALES, CHANGES

COLUMN PROVIDING DATA PATTERN RELEVANT TO CHANGES

COLUMN WITH GREATER SIMILARITY TO SALES

| DATE | PRODUCT CODE | CUSTOMER CODE | STORE CODE | SALES |
|---|---|---|---|---|
| 2021/4/1 | 001 | 00001 | 01 | 100 |
| 2021/4/1 | 002 | 00002 | 02 | 200 |
| 2021/4/1 | 001 | 00003 | 03 | 100 |
| ... | ... | ... | ... | ... |

| STORE CODE | STORE NAME | REGION | SIZE |
|---|---|---|---|
| 01 | STORE X | KANTO DIST. | LARGE |
| 02 | STORE Y | KANSAI DIST. | LARGE |
| 03 | STORE Z | KANTO DIST. | MEDIUM |
| ... | ... | ... | ... |

| PRODUCT CODE | PRODUCT NAME | CATEGORY | UNIT PRICE |
|---|---|---|---|
| 001 | PRODUCT A | SPORTS | 100 |
| 002 | PRODUCT B | OUTDOOR ACTIVITIES | 200 |
| 003 | PRODUCT C | COSMETICS | 300 |
| ... | ... | ... | ... |

| CUSTOMER CODE | AGE | GENDER | HOMETOWN | OCCUPATION | INCOME |
|---|---|---|---|---|---|
| 00001 | 30 | MALE | TOKYO | BUSINESSPERSON | JPY 5M |
| 00002 | 20 | FEMALE | OSAKA | STUDENT | JPY 3M |
| 00003 | 25 | FEMALE | KANAGAWA | SELF-EMPLOYED | JPY 4M |
| ... | ... | ... | ... | ... | ... |

FIG. 9
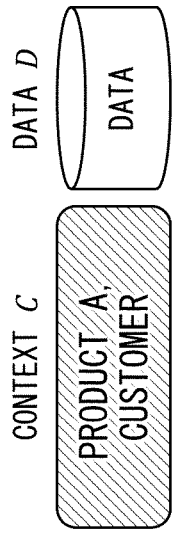
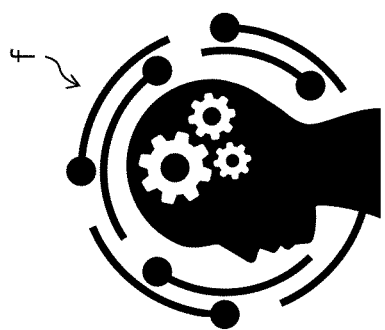
VISUALIZATION INFORMATION V
ATTRIBUTE: AGE, SALES
X-AXIS: AGE, Y-AXIS: SALES
FILTER: PRODUCT A
CHART TYPE: BAR CHART
AGGREGATION METHOD: ○○
...
CONTEXT C
PRODUCT A, CUSTOMER
DATA D
DATA
RECORD THE SCORES
| VISUALIZATION INFORMATION | SCORE |
|---|---|
| V1 | 0.1 |
| V2 | 0.5 |
| V3 | 0.3 |
| V4 | 0.3 |
| V5 | 0.8 |
| V6 | 0.7 |
| V7 | 0.9 |
| ... | ... |

FIRST DISPLAY EXAMPLE

SECOND DISPLAY EXAMPLE

THIRD DISPLAY EXAMPLE

| VISUALIZATION INFORMATION | SCORE |
|---|---|
| $V11$ | 0.2 |
| $V12$ | 0.1 |
| $V13$ | 0.8 |
| $V14$ | 0.6 |
| $V15$ | 0.3 |
| $V16$ | 0.5 |
| $V17$ | 0.9 |
| $V18$ | 0.7 |

FOURTH DISPLAY EXAMPLE

EXAMPLE OF GENERATED FEATURE VECTORS

EXAMPLES OF AGGREGATED DATA AND STATISTIC

INFORMATION PROCESSING APPARATUS, INFORMATION PROCESSING METHOD, AND STORAGE MEDIUM

This application is a National Stage Entry of PCT/JP2021/032767 filed on Sep. 7, 2021, the contents of all of which are incorporated herein by reference, in their entirety.

TECHNICAL FIELD

The present invention relates to an information processing apparatus, an information processing method, and a program.

BACKGROUND ART

In data analysis, it is common to repeat a cycle of "hypothesis setting, analyzing and visualizing, and hypothesis verifying"; however, this is very time-consuming and laborious. An automatic insight-discovery technique is a technique for automatically discovering a visualization candidate considered useful by a person, on the basis of the features of data. This makes it possible to greatly reduce the workload in data analysis. For example, Patent Literature 1 below discloses a method in which instance data is generated on the basis of template data having keywords expressing a method of visualizing the analysis result of the data, to visualize visualization target data, and then, the instance data is regenerated on the basis of an evaluation value of instance metadata.

CITATION LIST

Patent Literature

[Patent Literature 1]
International Publication No. WO 2018/173251

SUMMARY OF INVENTION

Technical Problem

However, data visualization results required by a user vary depending on, for example, the contents of the data and the needs of the user, and cannot be uniformly determined. The technique disclosed in Patent Literature 1 has had a problem in that, when the template data does not correctly perceive a user context, the visualization candidate presented does not necessarily represent a visualization result required by the user.

An example aspect of the present invention has been made in view of this problem, and an example object thereof is to provide a technique for displaying information that provides an insight required by a user.

Solution to Problem

An information processing apparatus in accordance with an example aspect of the present invention, includes at least one processor, the at least one processor carrying out: an obtaining process of obtaining an evaluation dataset and context data; a relevance calculation process of calculating a relevance between the context data and a constituent element of the evaluation dataset; an evaluation process of carrying out evaluations of a plurality of insight subjects generated with reference to the evaluation dataset and the relevance; and a display process of displaying information relevant to the insight subjects.

An information processing method in accordance with an example aspect of the present invention, includes: obtaining, by at least one processor, an evaluation dataset and context data; calculating, by the at least one processor, a relevance between the context data and a constituent element of the evaluation dataset; carrying out, by the at least one processor, evaluations of a plurality of insight subjects generated with reference to the evaluation dataset and the relevance; and displaying, by the at least one processor, information relevant to the insight subjects.

A storage medium in accordance with an example aspect of the present invention is a computer-readable non-transitory storage medium storing therein a program for causing a computer to carry out: a process of obtaining an evaluation dataset and context data; and a process of calculating a relevance between the context data and a constituent element of the evaluation dataset; a process of carrying out evaluations of a plurality of insight subjects generated with reference to the evaluation dataset and the relevance; and a process of displaying information relevant to the insight subjects.

Advantageous Effects of Invention

According to an example aspect of the present invention, it is possible to display information that provides an insight required by a user.

BRIEF DESCRIPTION OF DRAWINGS

FIG. 5 is a diagram illustrating an example of input data in accordance with the second example embodiment of the present invention.

FIG. 6 is a diagram illustrating an example of a generated context in accordance with the second example embodiment of the present invention.

FIG. 8 is a diagram illustrating an example of a calculation method of the relevance between the context and the input data, in accordance with the second example embodiment of the present invention.

FIG. 9 is a diagram illustrating an example of an evaluation process in accordance with the second example embodiment of the present invention.

EXAMPLE EMBODIMENTS

First Example Embodiment

The following description will discuss a first example embodiment of the present invention in detail with reference to the drawings. The present example embodiment is basic to example embodiments that will be described later.

<Configuration of Information Processing Apparatus>

Figure 1:
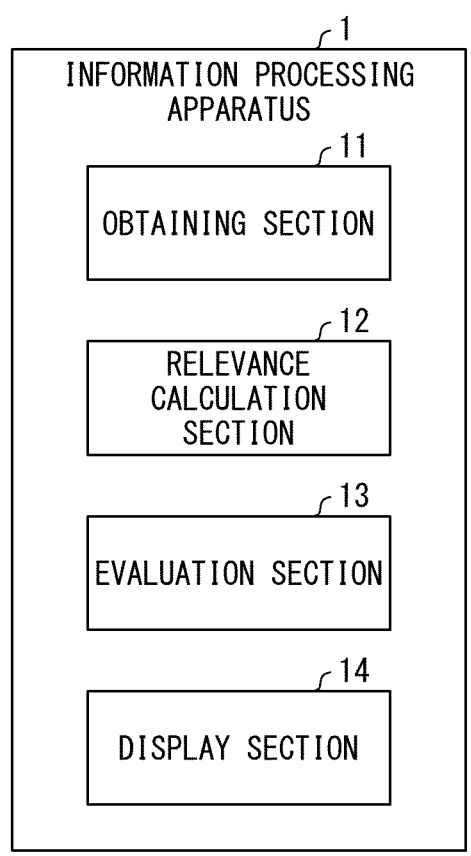
FIG. 1 is a block diagram illustrating the configuration of an information processing apparatus in accordance with a first example embodiment of the present invention.

The following description will discuss the configuration of an information processing apparatus 1 in accordance with the present example embodiment with reference to FIG. 1. FIG. 1 is a block diagram illustrating the configuration of the information processing apparatus 1. The information processing apparatus 1 is an apparatus that visualizes data and displays the visualized data. As illustrated in the figure, the information processing apparatus 1 includes an obtaining section 11, a relevance calculation section 12, an evaluation section 13, and a display section 14. The obtaining section 11 obtains an evaluation dataset and context data. The relevance calculation section 12 calculates the relevance between the context data and a constituent element of the evaluation dataset. The evaluation section 13 carries out evaluations of a plurality of insight subjects generated with reference to the evaluation dataset and the relevance. The display section 14 displays information relevant to the insight subjects.

(Evaluation Dataset)

The evaluation dataset is data for use by the information processing apparatus 1 in evaluation of visualization candidates of data. The evaluation dataset may include either or both of evaluation data, which is data to be visualized, and relevant data that is relevant to the evaluation data. Note that the data included in the evaluation dataset is not limited to these examples, and the evaluation dataset may include other information.

(Evaluation Data)

The evaluation data is data to be visualized, and, as an example, the evaluation data may be multidimensional data including a plurality of records. For example, the evaluation data may include: data indicating sales records of monthly sales at a given store; data indicating the size of the store and the region where the store stand; data indicating the product code, product name, and unit price of a product sold at the store; and/or data indicating the customer's gender, age, hometown, occupation, etc. Note that the evaluation data is not limited thereto, and may be other data. For example, the evaluation data may be visualized on a chart (a pie chart, a bar chart, a line graph, etc.) that represents the contents of the evaluation data.

(Relevant Data)

The relevant data is data that is relevant to the evaluation data. For example, the relevant data may include: aggregated data representing the aggregating result of the evaluation data; statistics of the aggregated data; and/or relevant information that is a set of various pieces of information for use in visualization of the evaluation data. For example, the relevant information may include at least one or all of: the name of data for use in visualization of the evaluation data; the data type of the data; the type of the aggregation method; and the type of chart design. Note that the data included in the relevant data is not limited to these examples, and the relevant data may include other data.

(Context Data)

The context data is data that represents what insight a user requires. For example, the context data may include either or both of: a context that is data about an insight required by a user; and a feature vector that represents the context in a vector space. Note that the data included in the context data is not limited to these examples, and the context data may include other data.

(Context)

The context is data about an insight required by a user, and, for example, the context may be linguistic information extracted from a user query or metadata. Specifically, for example, the context may be words "product A" and "customer", which are extracted from a user query of "regarding a customer of product A". Further, as another example, the context may be, for example, words "sales" and "changes", which are extracted from a user query of "regarding sales changes". Further, for example, the context may be words "product A" and "customer", which are extracted from metadata in which "search history" is "customer of product A". Further, for example, the context may be words "sales" and "changes", which are extracted from metadata in which "search history" is "sales changes". Note that the context is not limited to the linguistic information, and may be other information. For example, the context may be location information indicating the location of a user, information representing a relevance between words, or information indicating a browsing history of a website.

(Relevance)

The relevance between the context data and a constituent element of the evaluation dataset is information indicating the degree of relevance between the context data and the constituent element of the evaluation dataset. As an example, the relevance may be the similarity between a character string which is a context and a character string which is a constituent element included in the evaluation dataset. For example, as the similarity of character strings, the Hamming distance, the Levenshtein distance, or the Jaro-Winkler distance may be employed. Further, as an example, the relevance may be information representing the semantic similarity of character strings. For example, as the semantic similarity of character strings, the Euclidean distance, the inner product, the cosine similarity, or the like in a case where the semantic representation of the character strings is expressed in a vector space may be employed. Further, as an example, the relevance may be information representing the co-occurrence of character strings. For example, as the co-occurrence of character strings, the Euclidean distance, the inner product, the cosine similarity, or the like in a case where the co-occurrence relationship of the character strings is expressed in a vector space may be employed. Further, as an example, the relevance may be information that represents the similarity between a data pattern corresponding to the context and a data pattern of the constituent element of the evaluation dataset.

(Insight Subject)

The insight subject is data generated with reference to the evaluation dataset and the relevance. For example, the insight subject may include either or both of: data representing a visualization result of the evaluation data; and data for use in visualization of the evaluation data. For example, the visualization result obtained by visualizing the evaluation data may be a chart (a pie chart, a bar chart, a line graph, etc.) that represents the contents of the evaluation data. Alternatively, as an example, the insight subject may be part of the abovementioned relevant data, such as relevant information contained in the relevant data. That is, the insight subject may be part of the evaluation dataset. However, the insight subject is not limited to these examples, but may be other data.

(Insight)

Further, as used in this specification, an insight refers to a visualization result recognized as beneficial by a person, and data representing such a visualization result. That is, an insight refers to an insight subject recognized as beneficial by a person.

A method of obtaining the evaluation dataset and the context data by the obtaining section 11 is not particularly limited. For example, the obtaining section 11 may obtain the evaluation dataset and the context data from an external storage device or an internal storage device. Further, the obtaining section 11 may obtain the evaluation dataset and the context data with a communication interface (IF) or an input-and-output interface (IF).

The technique for calculating the relevance by the relevance calculation section 12 is not particularly limited. As an example, the relevance calculation section 12 may calculate the relevance representing the degree of similarity between a character string which is a context and a character string which is a constituent element included in the evaluation dataset. As an example, the relevance calculation section 12 may calculate the relevance representing the degree of semantic similarity between a character string which is a context and a character string which is a constituent element included in the evaluation dataset. As an example, the relevance calculation section 12 may calculate the relevance representing the degree of co-occurrence between a character string which is a context and a character string which is a constituent element included in the evaluation dataset. Further, as an example, the relevance calculation section 12 may calculate the relevance representing the degree of similarity between a data pattern corresponding to the context data and a data pattern of the constituent element of the evaluation dataset.

The technique for use by the evaluation section 13 to evaluate a plurality of insight subjects is not particularly limited. As an example, the evaluation section 13 calculates an evaluation value, which is an evaluation result of whether each of the plurality of insight subjects provides an insight required by a user. Hereinafter, this evaluation value is also referred to as an insight score. The insight score provides a great help in finding an insight subject that provides an insight required by a user even if the insight score is outputted as it is. In addition, use of the insight score also makes it possible to automatically detect an insight subject having a high insight score, this is, an insight subject that is likely to provide an insight required by the user.

As an example, the evaluation section 13 carries out evaluations of a plurality of insight subjects by using an evaluation model that takes the relevant data and the context data as input and outputs an evaluation value. The evaluation model may be a predefined score function, or may be a trained model constructed by machine learning. When the score function is used, as an example, the evaluation section 13 carries out evaluations of a plurality of insight subjects by using the score function that outputs a higher evaluation value as relevance between the relevant data and the context data increases. Note that the technique for evaluation carried out by the evaluation section 13 is not limited thereto, and other techniques may be used.

Visualization results obtained by visualizing the evaluation data vary depending on the contents of relevant information or the like used in visualization. Hereinafter, each of a plurality of visualization results obtained by visualizing the evaluation data in different patterns is also referred to as a "visualization candidate". Hereinafter, the visual features provided to a user by respective visualization candidates of the evaluation data vary among the plurality of visualization candidates.

The insight subjects correspond to the visualization candidates of the evaluation data on a one-to-one basis. Thus, the evaluation section 13 carries out evaluations of the plurality of insight subjects in relation to the context data, to evaluate the plurality of visualization candidates in relation to the context data.

The display mode of the information on the insight subject displayed by the display section 14 is not particularly limited. As an example, the display section 14 may give priority to displaying an insight subject that is rated relatively high in the evaluations by the evaluation section 13 over an insight subject that is rated relatively low in the evaluations. Further, as an example, the display section 14 may display the relevant information included in the relevant data together with the corresponding evaluation result obtained by the evaluation section 13 in association with each other.

As described in the foregoing, the information processing apparatus 1 in accordance with the present example embodiment employs a configuration of including: an obtaining section 11 that obtains an evaluation dataset and context data; a relevance calculation section 12 that calculates the relevance between the context data and a constituent element of the evaluation dataset; an evaluation section 13 that carries out evaluations of a plurality of insight subjects generated with reference to the evaluation dataset and the relevance; and a display section 14 that displays information relevant to the insight subjects. Thus, the information processing apparatus 1 in accordance with the present example embodiment achieves an example advantage of being capable of displaying information that provides an insight required by a user.

The above functions of the information processing apparatus 1 can be implemented via a program. The program in accordance with the present example embodiment causes a computer to carry out: a process of obtaining an evaluation dataset and context data; a process of calculating the relevance between the context data and a constituent element of the evaluation dataset; a process of carrying out evaluations of a plurality of insight subjects generated with reference to the evaluation dataset and the relevance; and a process of displaying information relevant to the insight subjects. Thus, the program in accordance with the present example embodiment achieves an example advantage of being capable of displaying information that provides an insight required by a user.

<Flow of Information Processing Method>

Figure 2:
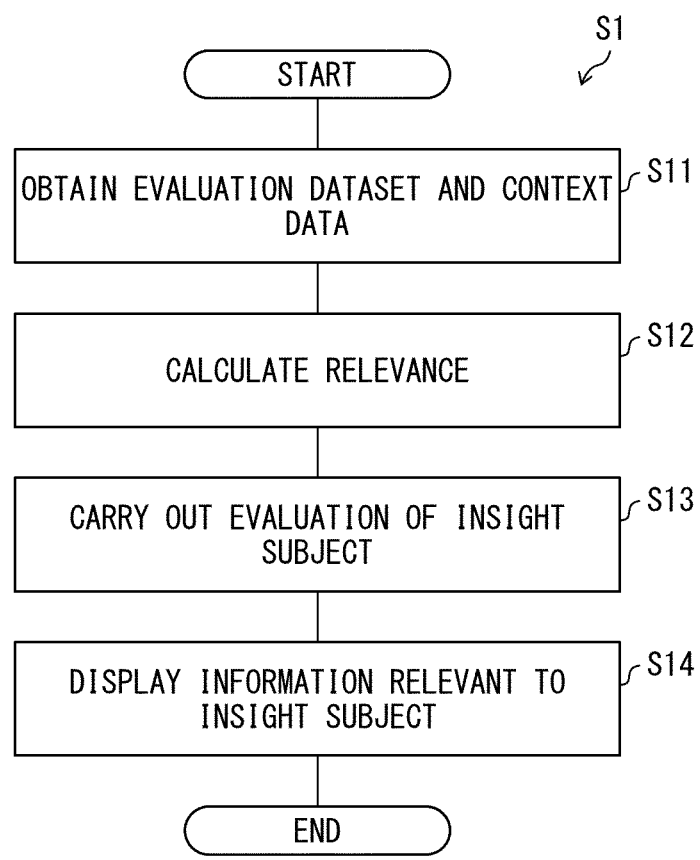
FIG. 2 is a flowchart illustrating the flow of an information processing method in accordance with the first example embodiment of the present invention.

The following description will discuss the flow of an information processing method S1 in accordance with the present example embodiment with reference to FIG. 2. FIG. 2 is a flowchart illustrating the flow of the information processing method S1.

In step S11, at least one processor obtains an evaluation dataset and context data. Then, in step S12, the at least one processor calculates the relevance between the context data and a constituent element of the evaluation dataset. In step S13, the at least one processor carries out evaluations of a plurality of insight subjects generated with reference to the evaluation dataset and the relevance. In step S14, the at least one processor displays information relevant to the insight subjects. This terminates the information processing method S1 of FIG. 2.

Note that the processes in S11 to S14 may be carried out by one processor, or alternatively, the processes in S11 to S14 may be shared by a plurality of processors. In the latter case, the processors may be processors that are provided in one information processing apparatus or may be processors that are provided in respective different information processing apparatuses. Further, the at least one processor that carries out the processes in S11 to S14 may be a processor(s) that is/are provided in the information processing apparatus 1.

As described in the foregoing, the information processing method S1 in accordance with the present example embodiment employs a configuration including: obtaining, by at least one processor, an evaluation dataset and context data; calculating, by the at least one processor, a relevance between the context data and a constituent element of the evaluation dataset; carrying out, by the at least one processor, evaluations of a plurality of insight subjects generated with reference to the evaluation dataset and the relevance; and displaying, by the at least one processor, information relevant to the insight subjects. Thus, the information processing method S1 in accordance with the present example embodiment achieves an example advantage of being capable of displaying information that provides an insight required by a user.

Second Example Embodiment

The following description will discuss a second example embodiment of the present invention in detail with reference to the drawings. The same reference numerals are given to constituent elements which have functions identical to those described in the first example embodiment, and descriptions as to such constituent elements are omitted as appropriate.

<Configuration of Information Processing Apparatus>

Figure 3:
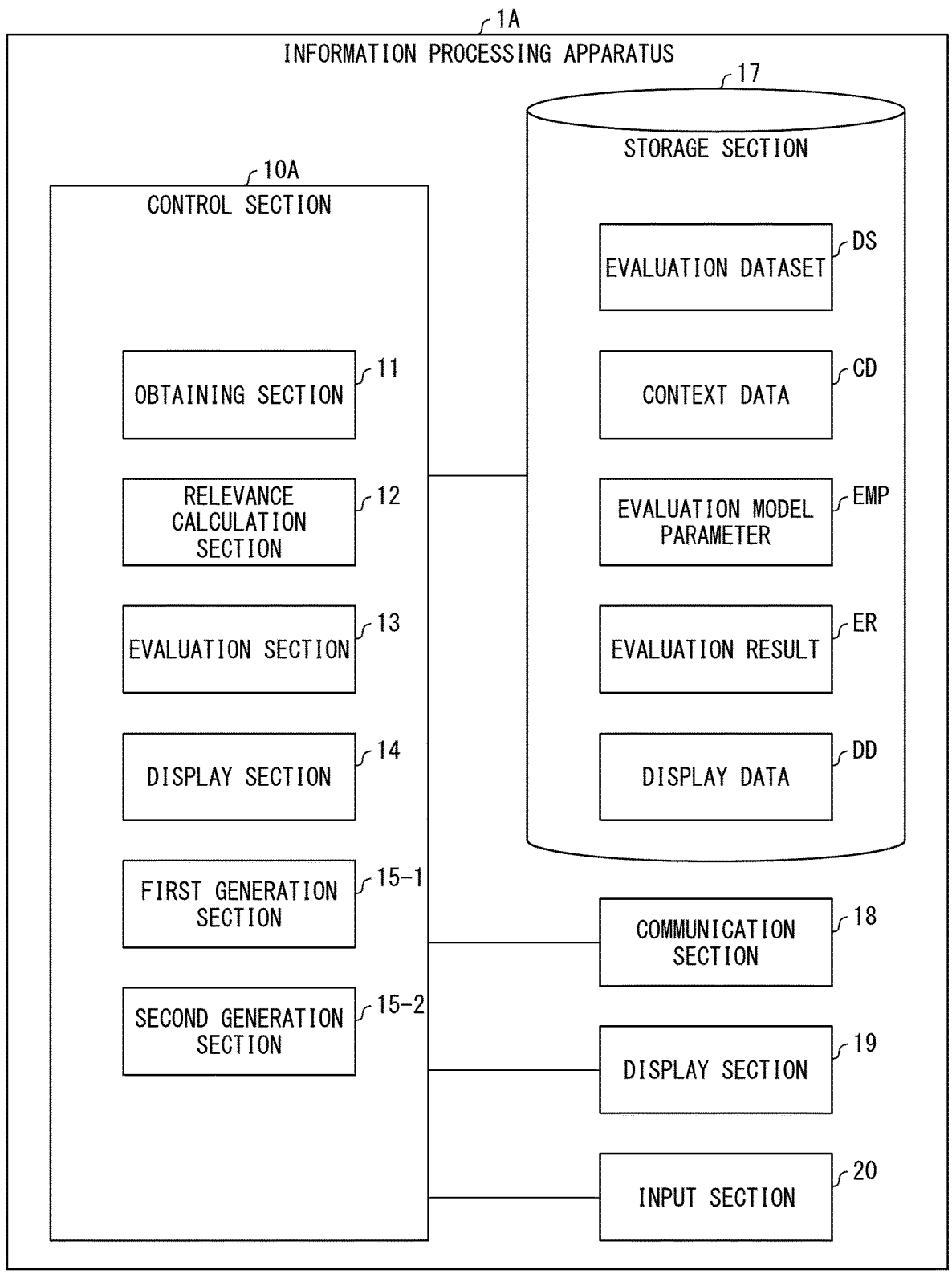
FIG. 3 is a block diagram illustrating the configuration of an information processing apparatus in accordance with a second example embodiment of the present invention.

FIG. 3 is a block diagram illustrating the configuration of an information processing apparatus 1A. The information processing apparatus 1A includes a control section 10A that centrally controls each section of the information processing apparatus 1A, and a storage section 17 that stores various data used by the information processing apparatus 1A. The information processing apparatus 1A includes: a communication section 18 that allows communication between the information processing apparatus 1A and other apparatuses; a display section 19 that allows the information processing apparatus 1A to output data by displaying the data; and an input section 20 that accepts input to the information processing apparatus 1A. The following description will discuss an example in which the display section 19 outputs data by displaying the data, but the information processing apparatus 1A may output data in another form, that is, for example, by means of printout or sound. The display section 19 and the input section 20 may be a device or devices that are external to the information processing apparatus 1A and are externally mounted to the information processing apparatus 1A.

The control section 10A includes an obtaining section 11, a relevance calculation section 12, an evaluation section 13, a display section 14, a first generation section 15-1, and a second generation section 15-2. The storage section 17 stores an evaluation dataset DS, context data CD, an evaluation model parameter EMP, an evaluation result ER, and display data DD.

(Evaluation Dataset DS)

The evaluation dataset DS includes evaluation data and relevant data VD relevant to the evaluation data. The evaluation data is data to be visualized, and, for example, the evaluation data may include: data indicating sales records of monthly sales at a given store; data indicating the size of the store and the region where the store stand; data indicating the product code, product name, and unit price of a product sold at the store; and/or data indicating the customer's gender, age, hometown, occupation, etc.

(Relevant Data VD)

The relevant data VD is data that is relevant to the evaluation data. The relevant data VD includes at least one selected from the group consisting of:

relevant information V that is relevant to the evaluation data;

a feature vector $d^V$ representing the relevant information V in a vector space;

aggregated data $s^V$ obtained by aggregating data that is included in the evaluation data and corresponds to the relevant information V; and Statistic $t^V$ of the aggregated data $s^V$.

(Relevant Information V)

As an example, the relevant information V is a set of various kinds of information for use in visualization of the evaluation data, and may include, for example, the following information:

attribute information of each of data included in the evaluation data;

information on the aggregation method (filter, aggregating function, column name serving as a key for the aggregating, etc.) (e.g., information on a filter to be applied to the evaluation data); and information on the chart design (x-axis, y-axis, chart type, plot type, etc.) (e.g., information on the relationship between each axis of the chart and items, etc.)

(Feature Vector $d^V$)

The feature vector $d^V$ of the relevant information is obtained by expressing the relevant information V in a vector space. Although any vectorization method may be employed, a distributed representation of words may be used, for example.

(Aggregated Data $s^V$)

The aggregated data $s^V$ is data that is obtained by aggregating numerical values corresponding to the relevant information V from the evaluation data. The aggregated data $s^V$ is plotted on a chart as a visualization result of the relevant information V.

(Statistic $t^V$)

The statistic $t^V$ of the aggregated data $s^V$ is obtained by listing various types of statistics of the aggregated data $s^V$. Any statistic may be employed, but, for example, the following may be used as the statistic $t^V$:
- max, min, and median;
- mean, standard deviation, and variance;
- cardinality;
- percentage of zero value and percentage of missing value;
- kurtosis and skewness;
- entropy; and
- Gini coefficient.

(Context Data CD)

Context data CD may include at least one selected from the group consisting of:
- context C, and
- a feature vector dc representing the context in a vector space.

(Context C)

The context C is data about an insight required by a user. As an example, the context C may be data that represents, in a natural language, an insight required by a user, and the context C may include data about the quality and quantity of an insight required by a user. The context C may be extracted from a user query Q and/or metadata M, which will be described later. For example, the context C may include words "product A" and "customer".

(Feature Vector $d^C$)

The feature vector $d^C$ of the context C represents the context C in a vector space. Although any vectorization method may be employed, a distributed representation of words may be used, for example.

(User Query Q)

The user query Q is a query about an insight required by a user, and is given by the user in a natural language. For example, the user query Q may include the following information:
- Information on data to be analyzed (e.g., "product A", "sales");
- a hypothesis about the insight (e.g., " . . . is increasing", " . . . stands out"); and
- features of an assumed chart (e.g., aggregate by region, pie chart).

(Metadata M)

The Metadata M is information from which an insight required by a user can be estimated. As an example, the metadata M may be automatically collected by using a predetermined system. For example, the metadata M may include the following information:
- user's search history (e.g., the user has searched "product A, customer");
- user's analysis history (e.g., the user has carried out a customer analysis of product A in the past);
- user's evaluation history (e.g., the user has rated high a chart or the like as to customers of product A); and
- user's behavior history (e.g., the user stayed the website or store of product A for xx minutes).

(Evaluation Model Parameter EMP)

The evaluation model parameter EMP is a parameter defining an evaluation model f. The evaluation model f is a model that takes the relevant data VD and the context data CD as input and quantitatively evaluates an insight subject corresponding to the inputted relevant data VD. As the evaluation model f, any model is available as long as it can be used for estimating an evaluation result of an insight subject. For example, a rule-based model as described later or a model constructed by machine learning may be used as the evaluation model f. For example, output of the evaluation model f may be a score representing the evaluation result or a label probability. The evaluation model f will be described later.

(Evaluation Result ER)

The evaluation result ER is data indicating the evaluation result of an insight subject evaluated by the evaluation section 13. As an example, the evaluation result ER may be an insight score ŷ that represents the evaluation result for each of the plurality of insight subjects.

(Insight Score ŷ)

The insight score ŷ is a quantitative indicator of how appropriate the visualization is, calculated on the basis of an output value of the evaluation model f. For example, the insight score ŷ may be an output value of the evaluation model f, or alternatively, may be a value obtained by subjecting an output value of the evaluation model f to a process such as normalization and/or weighting. A specific example of the method of calculating the insight score ŷ will be described later.

(Display Data DD)

The display data DD is information on an insight subject(s) displayed by the display section 14. As an example, the display data DD is information representing an insight object(s) relevant to the context C. Further, as an example, the display data DD may include an evaluation result(s) ER of an insight object(s).

(Obtaining Section 11)

The obtaining section 11 obtains the evaluation dataset DS and the context data CD. As an example, the obtaining section 11 may obtain the evaluation dataset DS and the context data CD by reading them from the storage section 17. However, the method for obtaining the evaluation dataset DS and the context data CD is not particularly limited. For example, the obtaining section 11 may obtain the evaluation dataset DS and the context data CD inputted by a user of the information processing apparatus 1A via the input section 20. Further, for example, the obtaining section 11 may obtain the evaluation dataset DS and the context data CD from an external device by means of communication via the communication section 18.

(Relevance Calculation Section 12 and Evaluation Section 13)

The relevance calculation section 12 calculates the relevance between the context data and a constituent element of the evaluation dataset. The evaluation section 13 carries out evaluations of a plurality of insight subjects generated with reference to the evaluation data and the relevance. As an example, the evaluation section 13 may calculate an insight score ŷ for each of the plurality of insight subjects, generate an evaluation result ER indicating the calculation result, and store the evaluation result ER in the storage section 17.

(Display Section 14)

The display section 14 displays information on the insight subjects on the display section 19 by using the display data DD generated by the first generation section 15-1.

(First Generation Section 15-1)

The first generation section 15-1 generates a plurality of insight subjects with reference to the evaluation dataset and the relevance. A generation process of the insight subjects will be described later. Further, the first generation section 15-1 generates the display data DD. As an example, on the basis of the relevance calculated by the relevance calculation section 12, the first generation section 15-1 may generate the display data DD in which insight subjects relevant to the context C are listed.

(Second Generation Section 15-2)

The second generation section 15-2 generates the context data with reference to reference information. For example, the reference information may be a user query or metadata. Further, the second generation section 15-2 generates the evaluation dataset DS.

<Flow of Information Processing Method>

Figure 4:
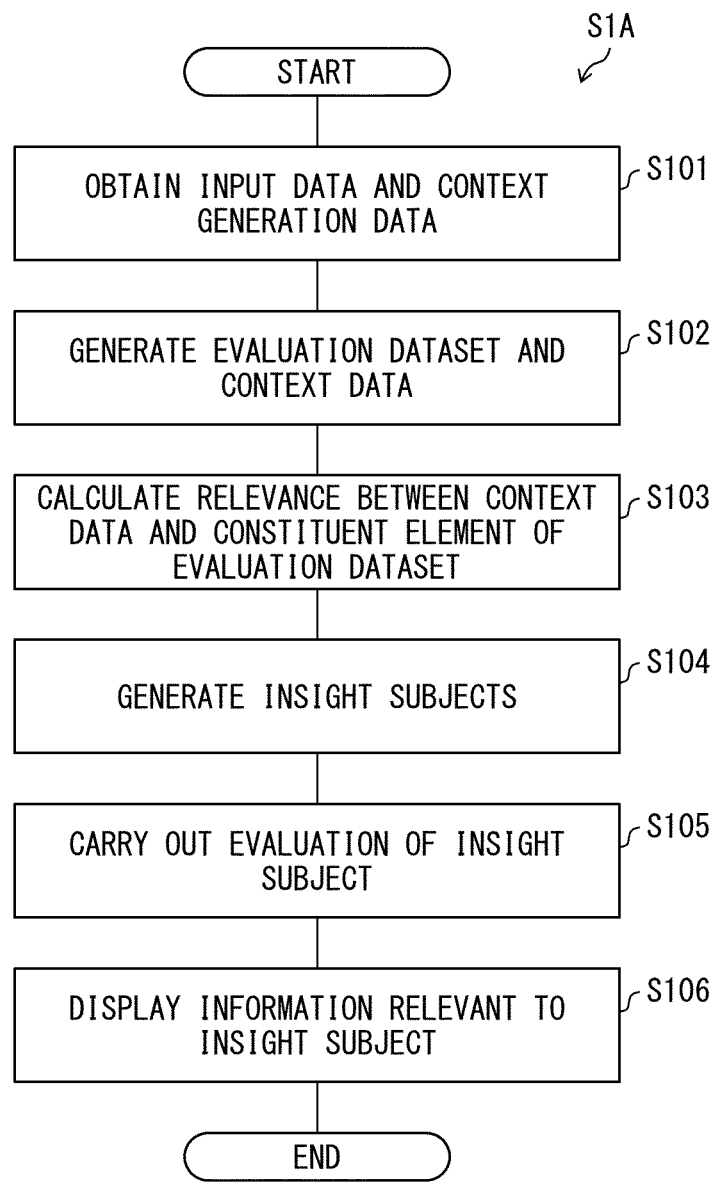
FIG. 4 is a flowchart illustrating the flow of an information processing method in accordance with the second example embodiment of the present invention.

The following description will discuss the flow of an information processing method in accordance with the present example embodiment with reference to the drawings. FIG. 4 is a flowchart illustrating the flow of the information processing method. The following description will discuss a case where the relevant information V is visualization information for use in visualization of the evaluation data. Hereinafter, the visualization information, which is an example of the relevant information V, is also referred to as "visualization information V".

(Step S101)

In step S101, the obtaining section 11 obtains input data D and context generation data. The input data D is an example of evaluation data in this specification. The input data D only needs to include data to be plotted on a chart, and any format is available as the format of the input data D. For example, the obtaining section 11 may obtain the input data D via the input section 20 or the communication section 18.

FIG. 5 is a diagram illustrating an example of the input data D. In the example shown in FIG. 5, the input data D includes sales data, store data, product data, and customer data. Each of the sales data, the store data, the product data, and the customer data is a dataset of multi-dimensional data including a plurality of records. The sales data is multi-dimensional data including data items of "date", "product code", "customer code", "store code", and "sales". The store data is multi-dimensional data including data items of "store code", "store name", "region", and "size". The product data is multi-dimensional data including data items of "product code", "product name", "category", and "unit price". The customer data is multidimensional data including data items of "customer code", "age", "gender", "hometown", "occupation", and "income".

(Context Generation Data)

The context generation data is data for generating the context C and is an example of the reference information in this specification. For example, the context generation data may include either or both of the user query Q and the metadata M. The context generation data may include a plurality of user queries, and may include a plurality of metadata. Note that the context generation data is not limited to the user query and/or the metadata, but may be other data. The context generation data may be data that is available as the context C as it is. For example, the obtaining section 11 may obtain the context generation data via the input section 20 or the communication section 18, or alternatively, the obtaining section 11 may obtain the context generation data by reading it from the storage section 17.

(Step S102)

In step S102, the second generation section 15-2 generates an evaluation dataset DS and context data CD. The following description will discuss specific examples of the generation of the evaluation dataset DS and the generation of the context data CD.

(Generation of Evaluation Dataset DS)

First, the second generation section 15-2 obtains visualization information V. The second generation section 15-2 may obtain the visualization information V by reading it from a predetermined storage area of the storage section 17, or alternatively, the second generation section 15-2 may obtain the visualization information V via the input section 20 or the communication section 18. At this time, the second generation section 15-2 obtains a plurality of pieces of the visualization information V. For example, the visualization information V may include: attribute information on each of data included in the input data D; information on the relationship between each axis of the chart and the items; and information on the filter, chart type, aggregation method, etc. to be applied to the input data D.

Further, the second generation section 15-2 generates a feature vector $d^V$ that expresses the obtained visualization information V in a vector space, using a desired language model. The feature vector $d^V$ is generated for each of the plurality of pieces of the visualization information V. The second generation section 15-2 generates (i) aggregated data $s^V$ that is obtained by aggregating numerical values corresponding to the visualization information V from the input data D, and (ii) a statistic $t^V$ that is a set of various types of statistics regarding the aggregated data $s^V$.

The second generation section 15-2 generates an evaluation dataset DS that includes (i) relevant data VD including the obtained visualization information V, and the generated feature vector $d^V$, aggregated data $s^V$, and statistic $t^V$, and (ii) the input data D obtained by the obtaining section 11 in step S101. The relevant data VD may include a plurality of pieces of the visualization information V and a plurality of feature vectors $d^V$, and may also include a pair of visualization information V and a feature vector $d^V$.

(Generation of Context Data CD)

Further, the second generation section 15-2 executes a desired natural language processing on the context generation data obtained by the obtaining section 11 in step S101, to generate a context C. Note that the second generation section 15-2 may use the context generation data as it is as the context C.

FIG. 6 is a diagram illustrating an example of the generated context. In the example depicted in FIG. 6, the second generation section 15-2 executes a natural language processing on user query Q1 of "regarding a customer of product A", to generate context C11 including "product A" and "customer". Further, the second generation section 15-2 executes a natural language processing on user query Q2 of "regarding sales changes", to generate context C12 including "sales" and "changes". Further, the second generation section 15-2 executes a natural language processing on metadata M1 in which "search history" is "customer of the product A", to generate the context C11 including "product A" and "the customer". Further, the second generation section 15-2 executes a natural language processing on metadata M2 in which "search history" is "sales changes", to generate the context C12 including "sales" and "changes".

The second generation section 15-2 generates a feature vector $d^C$, which expresses the generated context C in a vector space, using a desired language model, to generate context data CD including the generated feature vector $d^C$ and the context C.

(Step S103)

Figure 7:
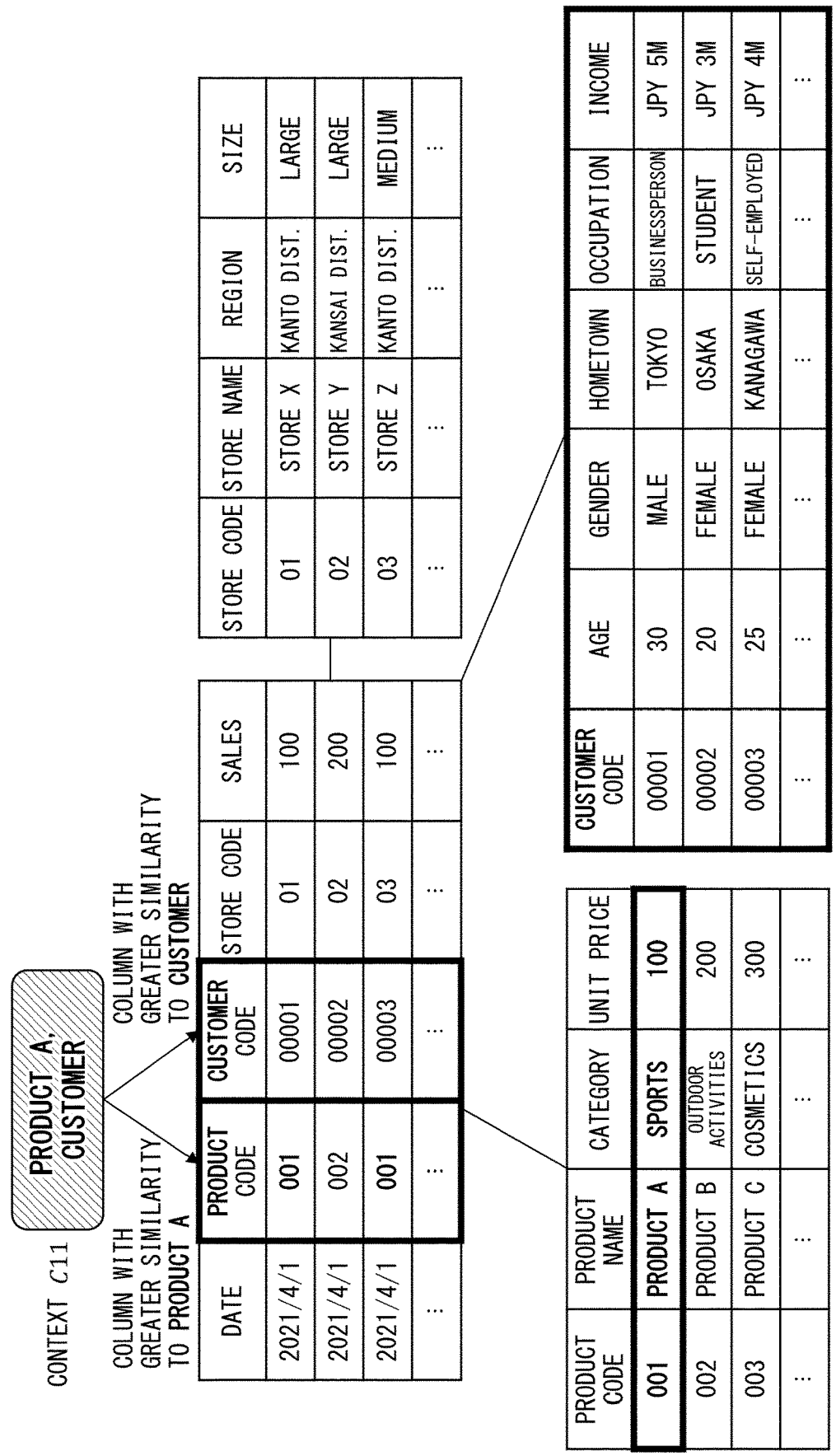
FIG. 7 is a diagram illustrating an example of a calculation method of the relevance between the context and the input data, in accordance with the second example embodiment of the present invention.

In step S103 of FIG. 4, the relevance calculation section 12 calculates the relevance between the context data CD and a constituent element of the evaluation dataset DS. FIGS. 7 and 8 are diagrams each illustrating an example of a calculation method of the relevance between the context data CD and the evaluation dataset DS. FIG. 7 illustrates an example in which the context data CD includes the context C11 of "product A" and "customer", and the input data D included in the evaluation dataset DS includes sales data, product data, store data, and customer data, as illustrated in FIG. 5. In this case, the relevance calculation section 12 calculates the relevance between each of "product A" and "customer" of the context C11, and each of the plurality of constituent elements of the input data D. In the example depicted in FIG. 7, the constituent elements of the input data D includes, for example, each of the sales data, the store data, the product data, and the customer data, and data items of each data.

In the example shown in FIG. 7, a column of the "product code" of the sales data and a row that includes "product A" in the item "product name" of the product data have a high similarity in character string to the "product A" of the context C11. Therefore, the relevance calculated by the relevance calculation section 12 becomes greater than in the other constituent elements. Further, a column of the "customer code" of the sales data and the customer data each has a high similarity in character string to the "customer" of the context C11. Therefore, the relevance calculated by the relevance calculation section 12 becomes greater than in the other constituent elements.

FIG. 8 illustrates an example in which the context data CD includes the context C12 of "sales" and "changes", and the input data D included in the evaluation dataset DS includes sales data, product data, store data, and customer data, as illustrated in FIG. 5. In this case, the relevance calculation section 12 calculates the relevance between each of "sales" and "changes" of the context C12, and each of the plurality of constituent elements of the input data D.

In the example shown in FIG. 8, a column of the "sales" of the sales data has a high similarity in character string to the "sales" of the context C12. Therefore, the relevance calculated by the relevance calculation section 12 becomes greater than in the other constituent elements. Further, since a column of the "date" of the sales data has a data pattern corresponding to the "changes" of the context C12, the relevance calculated by the relevance calculation section 12 becomes greater than in the other constituent elements.

(Step S104)

In step S104 of FIG. 4, the first generation section 15-1 generates a plurality of insight subjects with reference to the evaluation dataset DS and the relevance calculated in step S103. As an example, the first generation section 15-1 may generate an insight subject including a constituent element with a nonzero relevance, among constituent elements of the evaluation dataset DS. Note that the generation method of an insight subject carried out by the first generation section 15-1 is not limited to those described above. For example, the first generation section 15-1 may generate an insight subject including a constituent element with a relevance that satisfies a predetermined condition (i.e., the relevance is not less than a threshold).

Further, in step S104, when the context is not given or when no constituent element of the relevant data is present, the first generation section 15-1 may generate insight subjects for all pieces of the visualization information V conceivable in the data table.

More specifically, for example, the first generation section 15-1 may generate an insight subject that represents the visualization result obtained by plotting, on a chart in a display mode represented by the visualization information V, the aggregated data $s^V$ included in the relevant data VD. At this time, the first generation section 15-1 generates a plurality of insight subjects by generating an insight subject for each of the plurality of pieces of the visualization information V. Further, since one insight subject is generated for one piece of the visualization information V, the visualization information V and the insight subject correspond in a one-to-one manner. Note that each insight subject is not limited to data representing a visualization candidate; for example, the visualization information V may be treated as an insight subject as it is.

(Step S105)

In step S105, the evaluation section 13 carries out an evaluation of an insight subject(s). As an example, the evaluation section 13 may carry out evaluations of a plurality of insight subjects in relation to the context data CD.

More specifically, as an example, the evaluation section 13 may carry out an evaluation for each of the plurality of insight subjects with reference to the relevant data VD and the context data CD. At this time, since the plurality of insight subjects correspond to the respective pieces of the relevant information V in a one-to-one manner, the evaluation section 13 evaluates each piece of the visualization information V. That is, the evaluation section 13 evaluates each of the plurality of insight subjects for each piece of the relevant information V included in the relevant data VD.

For example, the evaluation section 13 may carry out evaluations of a plurality of insight subjects by using an evaluation model that takes at least part of the relevant data and the context data as input and outputs an evaluation value. FIG. 9 is a diagram illustrating an example of an evaluation process carried out by the evaluation section 13. In the example depicted in FIG. 9, the evaluation section 13 carries out an evaluation of the plurality of insight subjects by using the evaluation model f that takes the visualization information V, the context data CD, and the input data D as input, and outputs an insight score $\hat{y}$. The evaluation model f may be a predefined score function, or may be a trained model constructed by machine learning. An evaluation method using the evaluation model f will be described later. The insight score $\hat{y}$ for each piece of the visualization information V obtained by the evaluation model f is stored in the storage section 17 as the evaluation result ER.

(Step S106)

In step S106, the display section 14 displays information relevant to an insight subject(s). As an example, on the basis of the relevance calculated by the relevance calculation section 12, the display section 14 may display information listing the pieces of the visualization information V relevant to the context. Here, the display section 14 may display information listing all of the insight subjects generated by the first generation section 15-1 when there is no context or there is no relevant insight subject.

More specifically, for example, the display section 14 displays at least one of the plurality of insight subjects together with the evaluation result obtained by the evaluation section 13, or displays the at least one of the plurality of insight subjects in a display mode determined depending on the evaluation result obtained by the evaluation section 13. Examples of the display mode determined depending on the evaluation result may include a display order or a displayed size. In this case, the display section 19 may give priority to displaying an insight subject that is rated relatively high in the evaluation by the evaluation section 13 over an insight subject that is rated relatively low in the evaluation carried out by the evaluation section 13.

Figure 10:
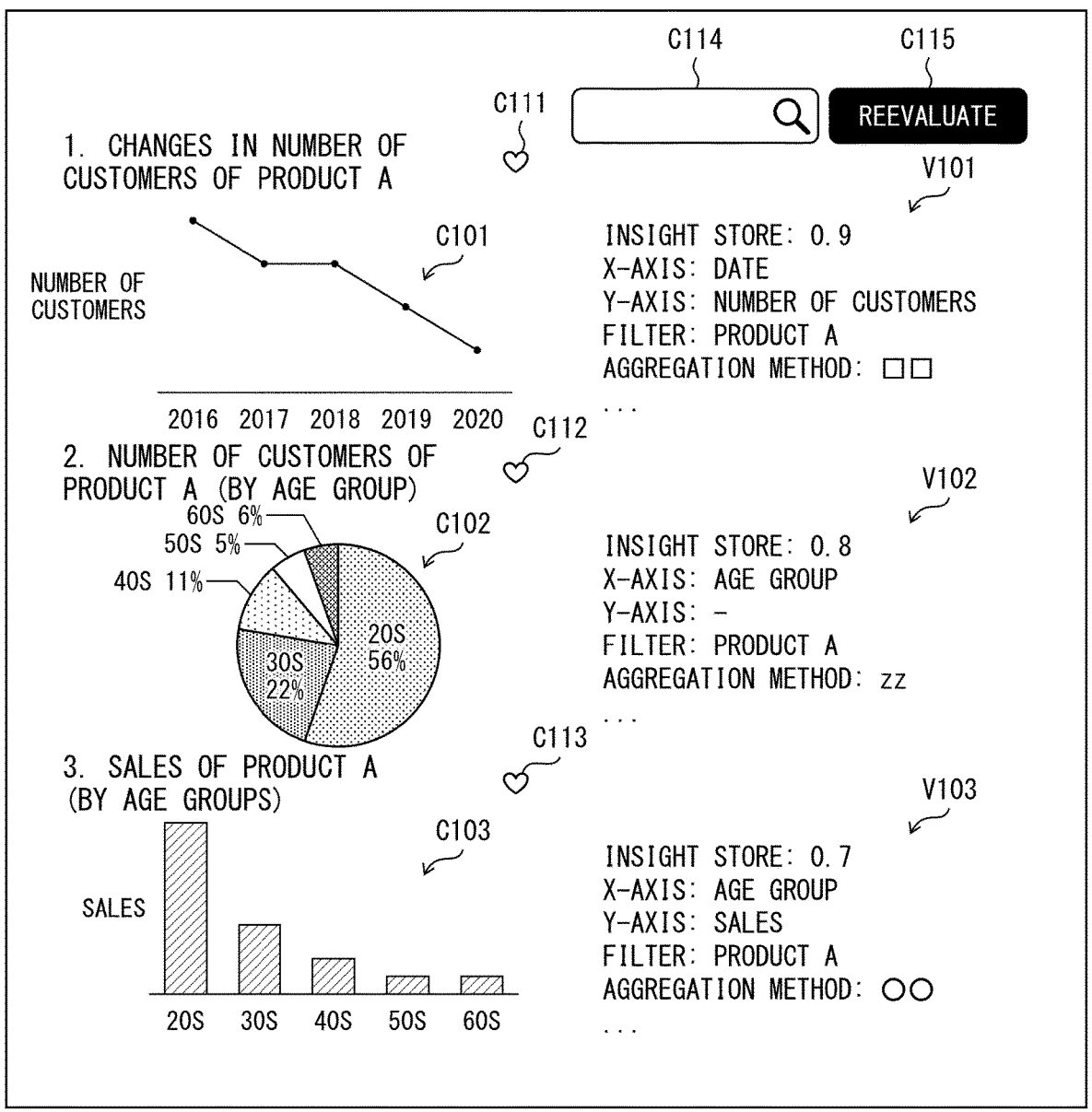
FIG. 10 is a diagram illustrating an example of display of a visualization result in accordance with the second example embodiment of the present invention.

The following description will discuss display examples of evaluation results with reference to FIGS. 10 to 13. FIG. 10 is a diagram illustrating a first display example of the visualization result. In the example depicted in FIG. 10, charts C101 to C103 are displayed in descending order of the insight scores $\hat{y}$. The charts C101 to C103 are three visualization results that are "1. Changes in number of customers of product A", "2. Number of customers of product A (by age groups)", and "3. Sales of product A (by age groups)". Further, the information V101, V102, V103 including the insight score y^ and the visualization information V, corresponding to the chart C101, C102, C103, is displayed in association with the chart C101, C102, C103.

In the first display example, for the charts C101 to C103, respective evaluation buttons C111 to C113 for use by a user to evaluate the visualization result are displayed. A search window C114 and a reevaluation button C115, which are provided for carrying out a reevaluation of the input data D, are also displayed. The reevaluation of the input data D will be described later.

Displaying the chart C101 allows a user to ascertain information such as "the number of customers of product A has decreased year by year". Further, displaying the chart C102 allows a user to ascertain information such as "the age group of main customers of product A is 20s".

Figure 11:
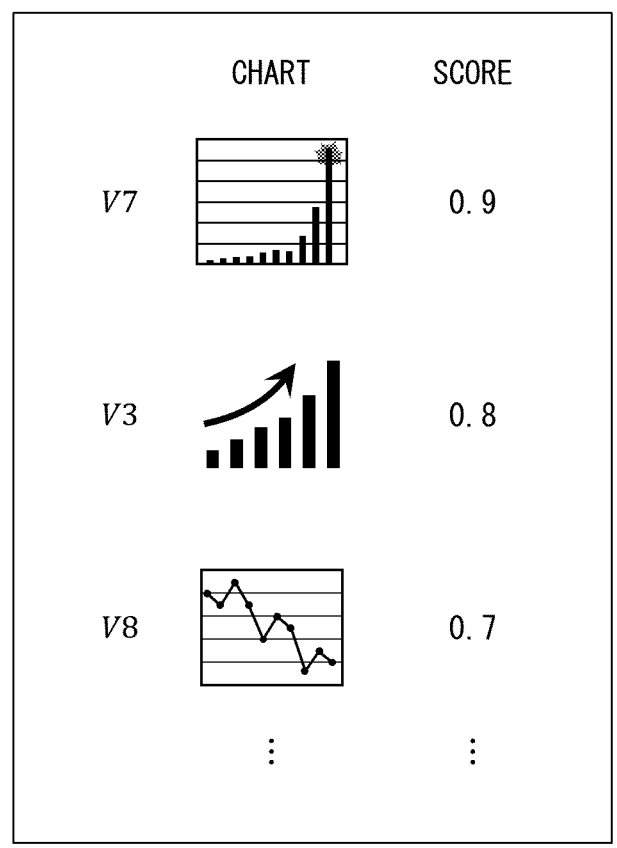
FIG. 11 is a diagram illustrating an example of a display that shows insight subjects together with those evaluation results, in accordance with the second example embodiment of the present invention.

FIG. 11 is a diagram illustrating an example of a display that shows insight subjects together with those evaluation results. In the example depicted in FIG. 11, each of the insight subjects V7, V3, V8, . . . is a chart representing the visualization result of the input data D, and the visual features of the insight subjects V7, V3, V8, . . . are different from each other. The insight score y^ of each insight subject is displayed next to the corresponding insight subject V7, V3, V8, . . . . In addition, the plurality of insight subjects V7, V3, V8, . . . are displayed in a descending order of the insight scores y^.

According to the example of FIG. 11, the user can easily ascertain which insight subject is highly rated on the basis of the display of the plurality of insight subjects in descending order of the insight scores y^.

Figures 12, 13:
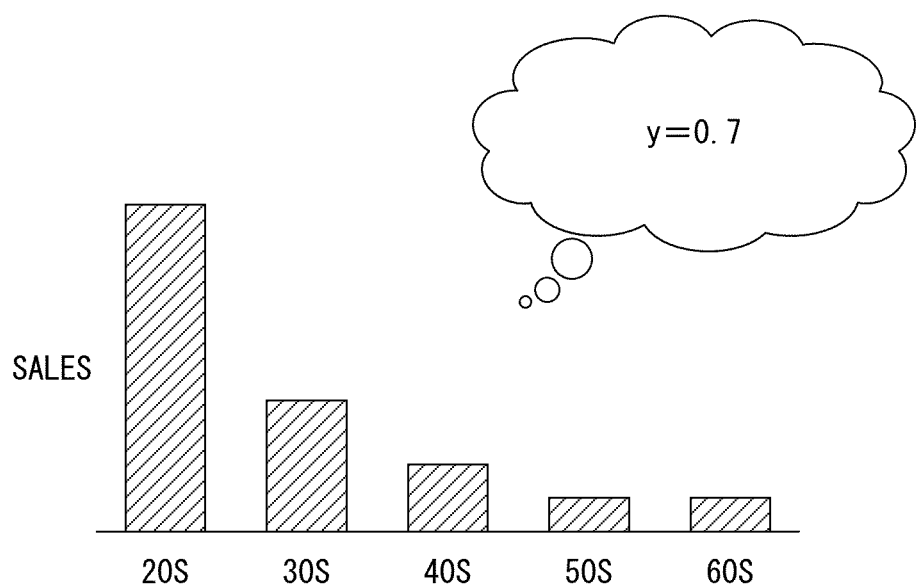
FIG. 12 is a table showing an example of a display that shows visualization information together with evaluation results thereof, in accordance with the second example embodiment of the present invention.
FIG. 13 is a diagram illustrating an example of a display that shows an insight subject together with the evaluation result, in accordance with the second example embodiment of the present invention.

FIG. 12 is a table showing an example of a display that shows the visualization information V together with the evaluation results. In the example depicted in FIG. 12, the display section 14 displays each piece of the relevant information V included in the relevant data together with a corresponding evaluation result obtained by the evaluation section 13 in association with each other. Specifically, the display section 19 displays visualization information V11 to V18 and the insight scores y^ of the corresponding visualization information V11 to V18 in association with each other.

FIG. 13 is a diagram illustrating an example of a display that shows an insight subject together with the evaluation result. In the example depicted in FIG. 13, the display section 14 displays a chart (bar chart) that is the visualization result of the input data D, and displays, together with the chart, the insight score y^ corresponding to the displayed chart.

The user can visually identify preferentially the visualization result that is likely to provide an insight required by the user, by means of the display of the display section 14. Thus, according to the present example embodiment, it is possible to carry out a display output that is easy to provide a user with an insight required by the user.

(Specific Example of Evaluation in Step S105)

Next, a specific example of the evaluation carried out by the evaluation section 13 in step S105 will be described with reference to FIGS. 14 to 16. As an example, the evaluation section 13 may carry out an evaluation of an insight subject by using the feature vector $d^C$, the feature vector $d^V$, the aggregated data $s^V$, and the statistic $t^V$.

Figure 14:
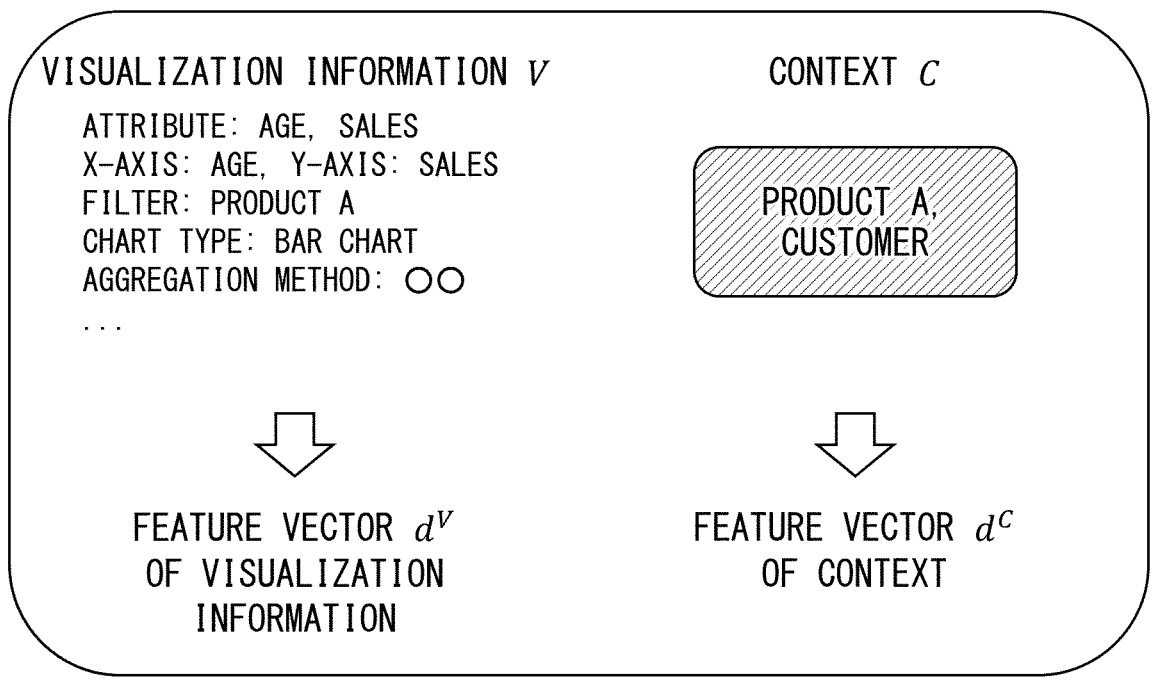
FIG. 14 is a diagram illustrating an example of generated feature vectors in accordance with the second example embodiment of the present invention.

FIG. 14 is a diagram illustrating an example of generated feature vectors $d^C$ and $d^V$. As illustrated in FIG. 14, the feature vector $d^V$ is generated from the visualization information V, and the feature vector de is generated from the context C.

Figure 15:
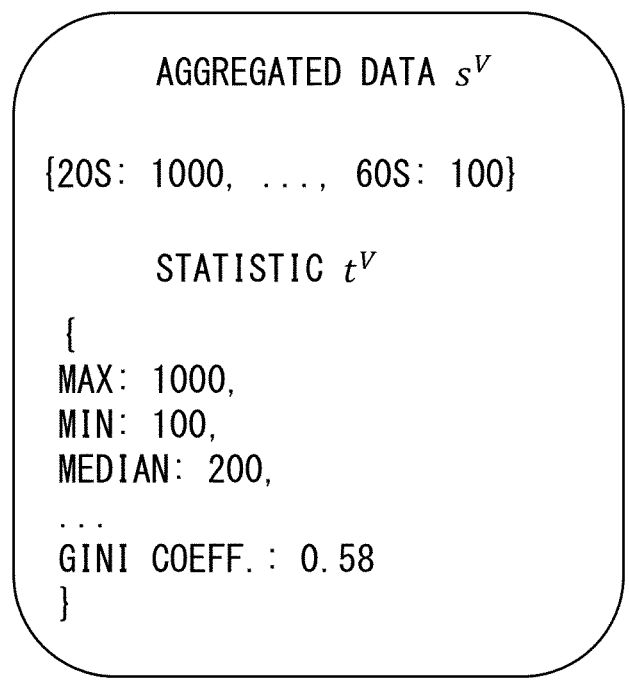
FIG. 15 is a diagram illustrating an example of aggregated data and statistics in accordance with the second example embodiment of the present invention.

FIG. 15 is a diagram illustrating an example of the aggregated data $s^V$ and the statistic $t^V$, which are generated by the second generation section 15-2. In the example depicted in FIG. 15, the aggregated data $s^V$ is data included in the input data D and obtained by aggregating data corresponding to the visualization information V. The statistic $t^V$ is data representing the statistics of the aggregated data $s^V$.

As a specific example of the evaluation carried out by the evaluation section 13, the following description will discuss a rule-based evaluation and a training-based evaluation.

(Rule-Based Evaluation)

In a case of the rule-based evaluation, the evaluation section 13 calculates a score $y_0\hat{\,}$ by using the relevant data VD and calculates an insight score y^ by using the score $y_0\hat{\,}$. At this time, the evaluation section 13 may use the score $y_0\hat{\,}$ as it is as the insight score y^, or alternatively, the evaluation section 13 may calculate the insight score y^ by subjecting the score $y_0\hat{\,}$ to a process such as normalization or weighting.

The calculation method of the score $y_0\hat{\,}$ is not limited, and the evaluation section 13 may use, for example, a score function defined based on a rule for each insight type, or alternatively, the evaluation section 13 may calculate the score $y_0\hat{\,}$ by using a model that learns features of a chart providing the insight.

In a case where the score function is used, the score function may be, for example, a function that outputs a higher evaluation value as relevance between the relevant data VD and the context data CD increases. That is, the evaluation section 13 carries out evaluations of the plurality of insight subjects by using a predefined score function that outputs a higher evaluation value as relevance between the relevant data VD and the context data CD increases.

(First Example of Rule-Based Evaluation)

For example, the evaluation section 13 may give an insight score y^ of zero or a negative value when the relevant data VD is less relevant to the context data CD, so as to lower the evaluation result. The method of calculating the degree of relevance (similarity) between the context data CD and the relevant data VD is not limited, and the evaluation section 13 may use, for example, the similarity of the set (Jaccard, Dice, Simpson, etc.), the similarity of the character string (Hamming distance, Levenshtein distance, Jaro-Winkler distance, etc.), and the similarity of the distributed representation (word2vec, fastText, BERT, etc.).

(Second Example of Rule-Based Evaluation)

The evaluation section 13 may calculate the insight score y^ by using a score weighted by the similarity of the context data CD and the relevant data VD. More specifically, for example, the product of the score $y_0\hat{\,}$ calculated by using the relevant data VD, and the similarity sim (CD, $D^V$) may be taken as the insight score y^.

(Training-Based Evaluation)

In the training-based evaluation, the evaluation section 13 carries out evaluations of the plurality of insight subjects by using a pretrained evaluation model f that takes the relevant data VD and the context data CD as input and outputs an evaluation value. The technique for machine learning of the evaluation model f is not limited, and, for example, a decision tree-based, linear regression, or neural network technique may be used, or alternatively, one or more of these techniques may be used. Examples of the decision tree-based technique may include Light Gradient Boosting Machine (LightGBM), and XGBoost. Examples of the linear regression may include support vector regression, Ridge regression, Lasso regression, and ElasticNet. Examples of the neural network may include deep learning.

In the training of the evaluation model f, any training data regarded as having an insight is available. For example, a chart created by a data analyst in the past may be regarded as including features that give an insight, and the visualization information V thereof may be used as a positive sample in the training. Further, the visualization information V of a chart considered to have no insight may be used as a negative sample in the training.

Figure 16:
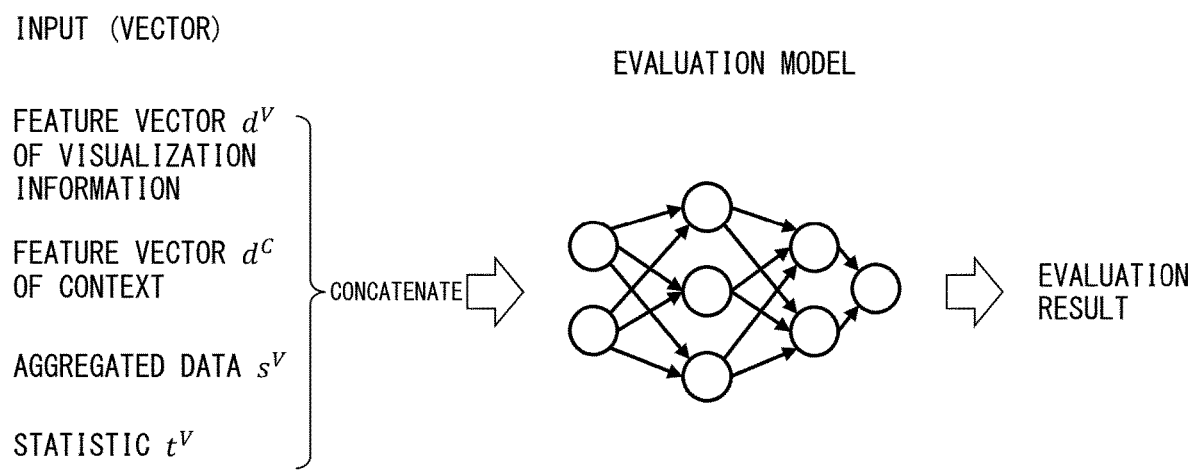
FIG. 16 is a diagram illustrating an example of an evaluation model in accordance with the second example embodiment of the present invention.

FIG. 16 is a diagram illustrating an example of the evaluation model f. In the example depicted in FIG. 16, the input of the evaluation model f includes the feature vector $d^V$, the feature vector $d^C$, the aggregated data $s^V$, and the statistic $t^V$. The output of the evaluation model f is an evaluation result, which may be, as an example, a label probability indicating whether to provide an insight required by a user.

(First Example of Training Based Evaluation Model)

In a case where a training label y regarding the insight of the visualization information V is given, the evaluation model can be trained as a classification model. For example, when a given label indicates that there is an insight when $y \in \{0,1\}$ is equal to 1 and there is no insight when $y \in \{0,1\}$ is equal to 0, it is sufficient to train a machine learning model that minimizes a loss function $E(\theta)$ given by the following equation (1), as a two-class classification task. In the equation (1), N is the number of training data.

$$E(\theta) = -\sum_{i=1}^{N} [y_i \log f(VD_i, CD_i, \theta) + (1 - y_i)\log(1 - f(VD_i, CD_i, \theta))] \quad (1)$$

The output of the machine learning model that minimizes this loss function can be interpreted as p ($y=1|VD_i$, $CD_i$), that is, the probability of being determined to have an insight. This can be used as the insight score y^.

(Second Example of Training Based Evaluation Model)

When a score or ranking representing the appropriateness of visualization for each piece of the visualization information V is given as training data, the evaluation model can be trained as a regression model. For example, when it is assumed that y is a score given by the training data, it is sufficient to train a machine learning model that minimizes the loss function $E(\theta)$ given by the following equation (2), for example. In the equation (2), N is the number of training data.

$$E(\theta) = \frac{1}{2}\sum_{i=1}^{N} \|y_i - f(VD_i, CD_i, \theta)\|^2 \quad (2)$$

The output of the machine learning model that minimizes this loss function is a score representing the appropriateness of visualization as in the case of the score of the training data; this may be used as the insight score y^.

Third Example Embodiment

The following description will discuss a third example embodiment of the present invention in detail with reference to drawings. Note that any constituent element that is identical in function to a constituent element described in the first example embodiment will be given the same reference symbol, and a description thereof will not be repeated.

Figure 17:
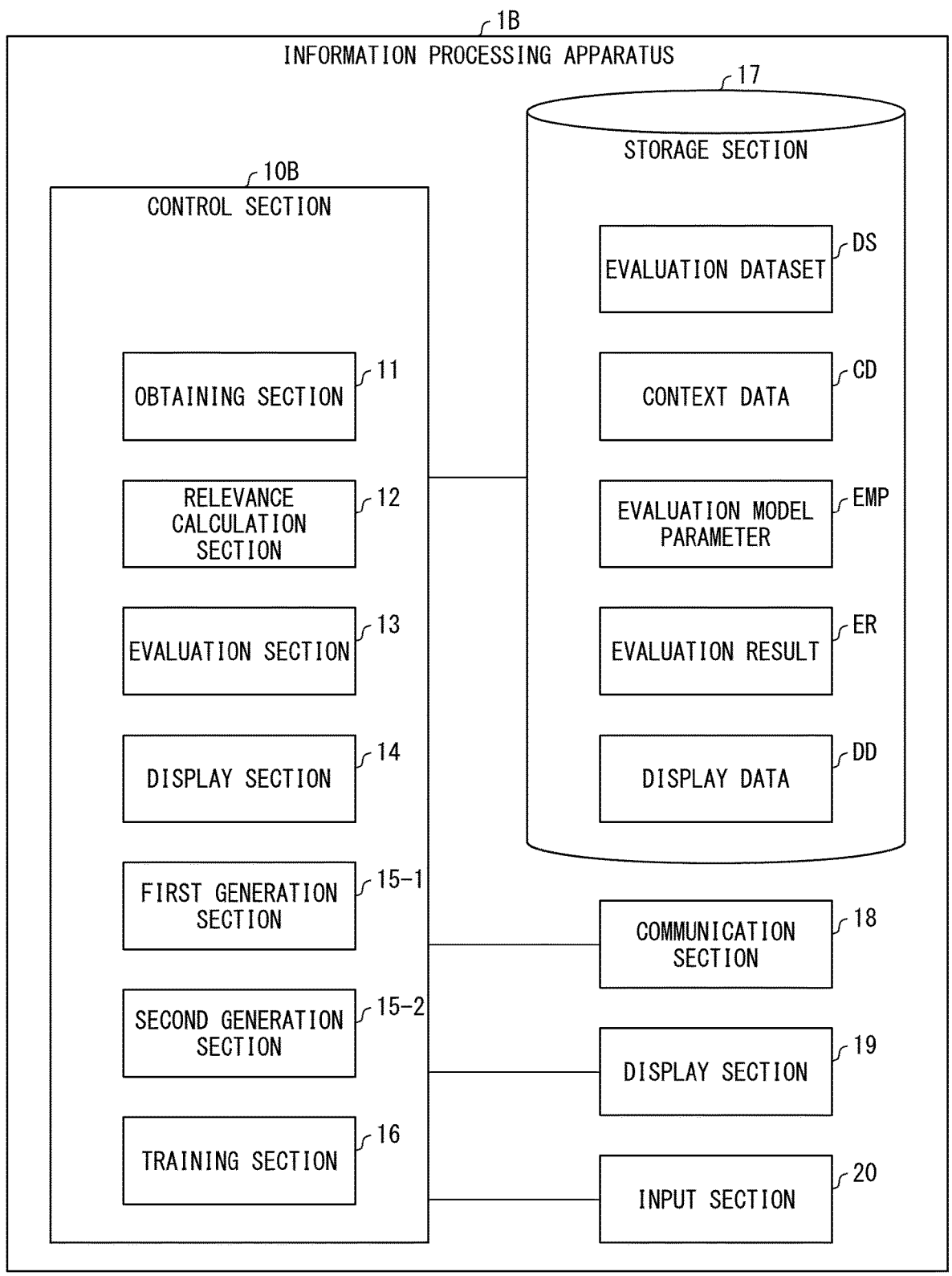
FIG. 17 is a block diagram illustrating the configuration of an information processing apparatus in accordance with a third example embodiment of the present invention.

FIG. 17 is a block diagram illustrating the configuration of an information processing apparatus 1B in accordance with the present example embodiment. As illustrated in FIG. 17, the information processing apparatus 1B is provided with a control section 10B instead of the control section 10A of the information processing apparatus 1A in accordance with the second example embodiment. The control section 10B includes a training section 16, besides an obtaining section 11, a relevance calculation section 12, an evaluation section 13, a display section 14, a first generation section 15-1, and a second generation section 15-2.

In the present example embodiment, the input section 20 accepts feedback from a user on the evaluation result of the evaluation section 13. Further, the evaluation section 13 carries out again the evaluations of the plurality of insight subjects with reference to the feedback from the user.

For example, in a case where the feedback from the user accepted by the input section 20 indicates that a rating given by the user is high, the obtaining section 11 may obtain the context data to which the feedback is reflected. The relevance calculation section 12 calculates the relevance between the context data to which the feedback is reflected and a constituent element of the evaluation dataset. The evaluation section 13 carries out evaluations of a plurality of insight subjects generated with reference to the evaluation dataset and the relevance.

The context and the user query can be updated at any timing. For example, the context and the user query may be updated by a user entering a character string in the search window C114 and selecting the reevaluation button C115, illustrated in FIG. 10. After the context and the user query are updated, the information processing apparatus 1B again executes an obtaining process of the context data and a display process of the information relevant to the insight subjects. This switches the information displayed on the display section 19.

Specifically, for example, in the display example of FIG. 10, when the user carries out (i) an operation of selecting one of the evaluation buttons C111 to C113 or (ii) an input operation to the search window C114 and an selection operation of the reevaluation button C115, the obtaining section 11 generates context data depending on the user's operation or operations of the item (i) or (ii), and executes the information processing method S1A illustrated in FIG. 4, using the generated context data. This causes information to which the feedback from the user is reflected to be displayed.

Further, the training section 16 may retrain the evaluation model f with reference to the feedback from the user. In this case, for example, the training section 16 may store a user's operation history regarding information (insight score y^, visualization information V, chart, etc.) relevant to an insight subject displayed by the display section 19, in the storage section 17 or the like as feedback from the user. For example, the user's operation history may include displaying duration of the information relevant to the insight subject, pressing of an evaluation button for the information relevant to the insight subject, and the like.

The training section 16 retrains the evaluation model f, reflecting the feedback from the user. For example, the training section 16 may retrain the evaluation model f, using highly rated visualization information V as a positive sample and low rated visualization information as a negative sample.

In the information processing apparatus 1B in accordance with the present example embodiment, the input section 20 accepts feedback from a user on the evaluation result, and the evaluation section 13 carries out again the evaluations of the plurality of insight subjects with reference to the feedback from the user. Thus, the information processing apparatus 1B in accordance with the present example embodiment achieves, in addition to the example advantage achieved by the information processing apparatus 1 in accordance with the first example embodiment, an example advantage of being capable of further improving the accuracy of the evaluations of the insight subjects.

Variations

In the first example embodiment described above, the processes carried out by one information processing apparatus 1 may be shared by a plurality of information processing apparatuses. In other words, some of the processes carried out by the information processing apparatus 1 may be carried out by at least one other information processing apparatus. That is, in a case where each of the abovementioned processes is carried out by at least one processor, the at least one processor may be a processor that is provided in one information processing apparatus 1, or may be a processor or processors that is or are provided in each of separate information processing apparatuses. The same applies to the information processing apparatus 1A in the second example embodiment and the information processing apparatus 1B in the third example embodiment.

[Software Implementation Example]

Some or all of the functions of each of the information processing apparatuses 1, 1A, and 1B may be implemented by hardware such as an integrated circuit (IC chip), or may be alternatively implemented by software.

Figure 18:
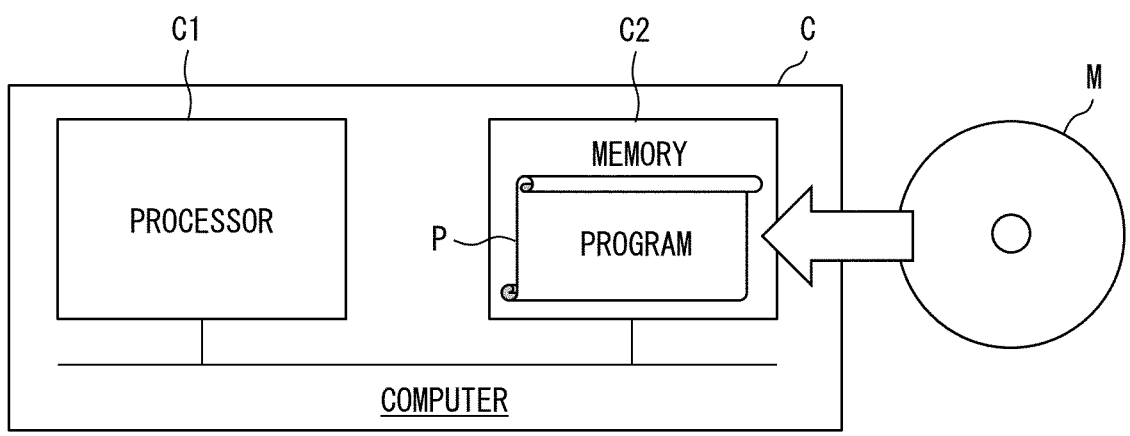
FIG. 18 is a diagram illustrating an example of a computer that executes instructions of a program which is software realizing the functions of the information processing apparatus.

In the latter case, the information processing apparatuses 1, 1A, and 1B are implemented by, for example, a computer that executes instructions of a program that is software implementing the foregoing functions. FIG. 18 illustrates an example of such a computer (hereinafter, referred to as "computer C"). The computer C includes at least one processor C1 and at least one memory C2. The memory C2 stores a program P for causing the computer C to operate as the information processing apparatuses 1, 1A, and 1B. The processor C1 of the computer C retrieves the program P from the memory C2 and executes the program P, so that the functions of the information processing apparatuses 1, 1A, and 1B are implemented.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

Additional Remark 1

The present invention is not limited to the above example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

An information processing apparatus including: obtaining means for obtaining an evaluation dataset and context data;
  relevance calculation means for calculating a relevance between the context data and a constituent element of the evaluation dataset;
  evaluation means for carrying out evaluations of a plurality of insight subjects generated with reference to the evaluation dataset and the relevance; and
  display means for displaying information relevant to the insight subjects.

With this configuration, it is possible to display information that provides an insight required by a user.

Supplementary Note 2

The information processing apparatus according to Supplementary note 1, further including first generation means for generating the plurality of insight subjects with reference to the evaluation dataset and the relevance.

With this configuration, it is possible to display information that provides an insight required by a user.

Supplementary Note 3

The information processing apparatus according to Supplementary note 2, wherein the first generation means generates an insight subject including a constituent element with a nonzero relevance, among constituent elements of the evaluation dataset.

With this configuration, it is possible to display information relevant to an insight subject including a constituent element with a nonzero relevance to the context data.

Supplementary Note 4

The information processing apparatus according to any one of Supplementary notes 1 to 3, wherein the evaluation dataset includes evaluation data and relevant data that is relevant to the evaluation data, and
  the evaluation means carries out an evaluation of each of the plurality of insight subjects for each piece of relevant information included in the relevant data.

With this configuration, it is possible to evaluate insight subjects for each piece of the relevant information.

Supplementary Note 5

The information processing apparatus according to Supplementary note 4, wherein the display means gives priority to displaying an insight subject that is rated relatively high in the evaluations by the evaluation means over an insight subject that is rated relatively low in the evaluations by the evaluation means.

With this configuration, it is possible to present ratings of insight subjects to a user.

Supplementary Note 6

The information processing apparatus according to Supplementary note 4 or 5, wherein the display means displays each piece of the relevant information included in the relevant data together with a corresponding evaluation result obtained by the evaluation means in association with each other.

With this configuration, it is possible to allow a user to ascertain the evaluation result of each of the plurality of insight subjects based on the information displayed by the display means.

Supplementary Note 7

The information processing apparatus according to any one of Supplementary notes 1 to 6, wherein the display means displays at least one of the plurality of insight subjects together with an evaluation result obtained by the evaluation means, or displays the at least one of the plurality of insight subjects in a display mode determined depending on the evaluation result obtained by the evaluation means.

With this configuration, it is possible to allow a user to more easily ascertain the evaluation result of the insight subjects based on the insight subjects displayed by the display means.

Supplementary Note 8

The information processing apparatus according to any one of Supplementary notes 1 to 7, wherein the evaluation means carries out evaluations of the plurality of insight subjects in relation to the context data.

With this configuration, it is possible to evaluate whether a visualization candidate of data provides an insight required by a user.

Supplementary Note 9

The information processing apparatus according to any one of Supplementary notes 1 to 8, further including second generation means for generating the context data with reference to reference information.

With this configuration, it is possible to display information that provides an insight corresponding to the reference information.

Supplementary Note 10

The information processing apparatus according to any one of Supplementary notes 1 to 9, further including accepting means for accepting feedback from a user on an evaluation result obtained by the evaluation means,
wherein the evaluation means carries out again the evaluations of the plurality of insight subjects with reference to the feedback from the user.

With this configuration, it is possible to further improve the accuracy of the evaluations of insight subjects.

Supplementary Note 11

The information processing apparatus according to Supplementary note 10, wherein when the feedback from the user accepted by the accepting means indicates that a rating given by the user is high,
  the obtaining means obtains context data to which the feedback is reflected,
  the relevance calculation means calculates a relevance between the context data to which the feedback is reflected and a constituent element of the evaluation dataset, and
  the evaluation means carries out evaluations of the plurality of insight subjects generated with reference to the evaluation dataset and the relevance.

With this configuration, it is possible to further improve the accuracy of the evaluations of insight subjects.

Supplementary Note 12

An information processing method including:
  obtaining, by at least one processor, an evaluation dataset and context data;
  calculating, by the at least one processor, a relevance between the context data and a constituent element of the evaluation dataset;
  carrying out, by the at least one processor, evaluations of a plurality of insight subjects generated with reference to the evaluation dataset and the relevance; and
  displaying, by the at least one processor, information relevant to the insight subjects.

Supplementary Note 13

A program for causing a computer to carry out:
  a process of obtaining an evaluation dataset and context data; and
  a process of calculating a relevance between the context data and a constituent element of the evaluation dataset;
  a process of carrying out evaluations of a plurality of insight subjects generated with reference to the evaluation dataset and the relevance; and
  a process of displaying information relevant to the insight subjects.

Additional Remark 3

Furthermore, some of or all of the above example embodiments can also be expressed as below.

An information processing apparatus includes at least one processor, the at least one processor carrying out: an obtaining process of obtaining an evaluation dataset and context data; a relevance calculation process of calculating a relevance between the context data and a constituent element of the evaluation dataset; an evaluation process of carrying out evaluations of a plurality of insight subjects generated with reference to the evaluation dataset and the relevance; and a display process of displaying information relevant to the insight subjects.

Note that the information processing apparatus may further include a memory, which may store therein a program for causing the at least one processor to carry out the obtaining process, the relevance calculation process, the evaluation process, and the display process. Alternatively, the program may be stored in a non-transitory, tangible computer-readable storage medium.

REFERENCE SIGNS LIST 1, 1A, 1B Information processing apparatus
10A, 10B Control section
11 Obtaining section (obtaining means)
12 Relevance calculation section (relevance calculation means)
13 Evaluation section (evaluation means)
14 Display section (display means)
15-1 First generation section
15-2 Second generation section
16 Training section
17 Storage section
18 Communication section
19 Display section
20 Input section (accepting means)

What is claimed is:

1. An information processing apparatus comprising at least one processor, the at least one processor carrying out:
   an obtaining process of obtaining an evaluation dataset which includes evaluation data and at least one character-string constituent element, and context data;
   a relevance calculation process of calculating a relevance between the context data and the character string which is the constituent element included in the evaluation dataset;
   a feature-vector generating process of converting the evaluation dataset and the context data into respective feature vectors by a pretrained language model;
   a relevance calculation process of calculating a relevance between the context data and the character-string constituent element on the basis of a similarity between the respective feature vectors;
   a first generation process of generating a plurality of insight subjects, each insight subject being configured to visualize a content of the evaluation data by representing the content on a predetermined chart with reference to the evaluation dataset and the calculated relevance;
   an evaluation process of carrying out evaluations of a plurality of the insight subjects by inputting the feature vectors to a neural-network evaluation model based on supervised deep learning and outputting, for each insight subject, a relevance score; and
   a display process of selecting at least one of the plurality of insight subjects in accordance with the relevance scores, ranking the insight subjects, and displaying a visualization result which visualizes the evaluation data by using the selected insight subjects.

2. The information processing apparatus according to claim 1, wherein in the first generation process, the at least one processor generates an insight subject including a constituent element with a nonzero relevance, among constituent elements of the evaluation dataset.

3. The information processing apparatus according to claim 1, wherein
   the evaluation dataset includes evaluation data and relevant data that is relevant to the evaluation data, and
   in the evaluation process, the at least one processor carries out an evaluation of each of the plurality of insight subjects for each piece of relevant information included in the relevant data.

4. The information processing apparatus according to claim 3, wherein in the display process, the at least one processor gives priority to displaying an insight subject that is rated relatively high in the evaluations in the evaluation process over an insight subject that is rated relatively low in the evaluations in the evaluation process.

5. The information processing apparatus according to claim 3, wherein in the display process, the at least one processor displays each piece of the relevant information included in the relevant data together with a corresponding evaluation result obtained in the evaluation process in association with each other.

6. The information processing apparatus according to 1, wherein in the display-process, the at least one processor displays at least one of the plurality of insight subjects together with an evaluation result obtained in the evaluation-process, or displays the at least one of the plurality of insight subjects in a display mode determined depending on the evaluation result obtained in the evaluation process.

7. The information processing apparatus according to claim 1, wherein in the evaluation process, the at least one processor carries out evaluations of the plurality of insight subjects in relation to the context data.

8. The information processing apparatus according to claim 1, wherein the at least one processor further carries out a second generation process of generating the context data with reference to reference information.

9. The information processing apparatus according to claim 1, wherein
   the at least one processor further carries out an accepting process of accepting feedback from a user on an evaluation result obtained in the evaluation process, and
   in the evaluation process, the at least one processor carries out again the evaluations of the plurality of insight subjects with reference to the feedback from the user.

10. The information processing apparatus according to claim 9, wherein when the feedback from the user accepted in the accepting process indicates that a rating given by the user is high,
    in the obtaining process, the at least one processor obtains context data to which the feedback is reflected,
    in the relevance calculation process, the at least one processor calculates a relevance between the context data to which the feedback is reflected and a constituent element of the evaluation dataset, and
    in the evaluation process, the at least one processor carries out evaluations of the plurality of insight subjects generated with reference to the evaluation dataset and the relevance.

11. An information processing method comprising:
    obtaining, by at least one processor, an evaluation dataset which includes evaluation data and at least one character-string constituent element, and context data;
    calculating, by the at least one processor, a relevance between the context data and the character string which is the constituent element included in the evaluation dataset;
    converting, by the at least one processor, the evaluation dataset and the context data into respective feature vectors by a pretrained language model;

calculating, by the at least one processor, a relevance between the context data and the character-string constituent element on the basis of a similarity between the respective feature vectors;

generating, by the at least one processor, a plurality of insight subjects, each insight subject being configured to visualize a content of the evaluation data by representing the content on a predetermined chart with reference to the evaluation dataset and the calculated relevance;

carrying out, by the at least one processor, evaluations of a plurality of the insight subjects by inputting the feature vectors to a neural-network evaluation model based on supervised deep learning and outputting, for each insight subject, a relevance score; and selecting, by the at least one processor, at least one of the plurality of insight subjects in accordance with the relevance scores, ranking the insight subjects, and displaying a visualization result which visualizes the evaluation data by using the selected insight subjects.

12. A computer-readable non-transitory storage medium storing therein a program for causing a computer to carry out:

a process of obtaining an evaluation dataset which includes evaluation data and at least one character-string constituent element, and context data;

a process of calculating a relevance between the context data and the character string which is the constituent element included in the evaluation dataset;

a process of converting the evaluation dataset and the context data into respective feature vectors by a pre-trained language model;

a process of calculating a relevance between the context data and the character-string constituent element on the basis of a similarity between the respective feature vectors;

a process of generating a plurality of insight subjects, each insight subject being configured to visualize a content of the evaluation data by representing the content on a predetermined chart with reference to the evaluation dataset and the calculated relevance;

a process of carrying out evaluations of a plurality of the insight subjects by inputting the feature vectors to a neural-network evaluation model based on supervised deep learning and outputting, for each insight subject, a relevance score; and a process of selecting at least one of the plurality of insight subjects in accordance with the relevance scores, ranking the insight subjects, and displaying a visualization result which visualizes the evaluation data by using the selected insight subjects.

13. The information processing apparatus according to claim 1, wherein a deep-learning neural-network evaluation model reinforces the evaluation process and outputs a decision-making score for each insight subject.

* * * * *